United States Patent
Omar et al.

(10) Patent No.: US 7,554,929 B1
(45) Date of Patent: Jun. 30, 2009

(54) MOBILITY AWARE PERFORMANCE EVALUATION

(75) Inventors: Hassan Mahmoud Omar, Mount Vernon, NY (US); Angel Polito, Manhasset, NY (US)

(73) Assignee: Verizon Services Corp., Arlington, VA (US)

( * ) Notice: Subject to any disclaimer, the term of this patent is extended or adjusted under 35 U.S.C. 154(b) by 625 days.

(21) Appl. No.: 11/264,254

(22) Filed: Nov. 2, 2005

(51) Int. Cl.
H04L 12/26 (2006.01)

(52) U.S. Cl. ................................ 370/252; 455/436
(58) Field of Classification Search .................. 370/252, 370/313; 455/517; 709/224; 380/270
See application file for complete search history.

(56) References Cited

U.S. PATENT DOCUMENTS

| | | | | |
|---|---|---|---|---|
| 7,251,496 | B2* | 7/2007 | Thubert et al. | 455/517 |
| 2004/0179688 | A1* | 9/2004 | Lee | 380/270 |
| 2006/0120315 | A1* | 6/2006 | Olivereau et al. | 370/313 |
| 2006/0224730 | A1* | 10/2006 | Fok et al. | 709/224 |

OTHER PUBLICATIONS

C. Perkins, Ed., "IP Mobility Support for IPv4," RFC 3344, Aug. 2002—published by the Internet Society of Reston, Virginia.
H. Chaskar, Ed., "Requirements of a Quality of Service (QoS) Solution for Mobile IP," RFC 3583, Sep. 2003—published by the Internet Society of Reston, Virginia.
P. Calhoun et al., "Diameter Base Protocol," RFC 3588, Sep. 2003—published by the Internet Society of Reston, Virginia.
D. Cong et al., Eds., "The Definitions of Managed Objects for IP Mobility Support using SMIv2," RFC 2006, Oct. 1996—published by the Internet Society of Reston, Virginia.
G. Montenegro, Ed., "Reverse Tunneling for Mobile IP, revised," RFC 3024, Jan. 2001—published by the Internet Society of Reston, Virginia.

* cited by examiner

*Primary Examiner*—Chi H Pham
*Assistant Examiner*—Albert T Chou

(57) ABSTRACT

A first node in a network is configured to send, to a second node in the network, an initial message indicating a test, wherein the initial message is intended to be received by a third node in the network. A test application configured to conduct a test by sending at least one test message from the first node to the second node, wherein the test message is intended to be received by the third node, said test application further configured to collect test information from at least one of the first node, the second node, and the third node after the test has been conducted.

20 Claims, 7 Drawing Sheets

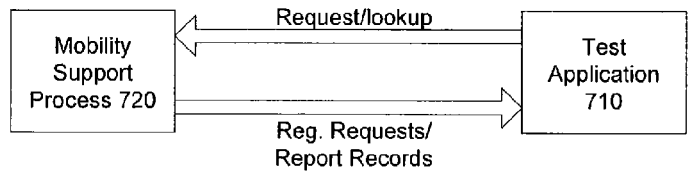
Fig. 7A
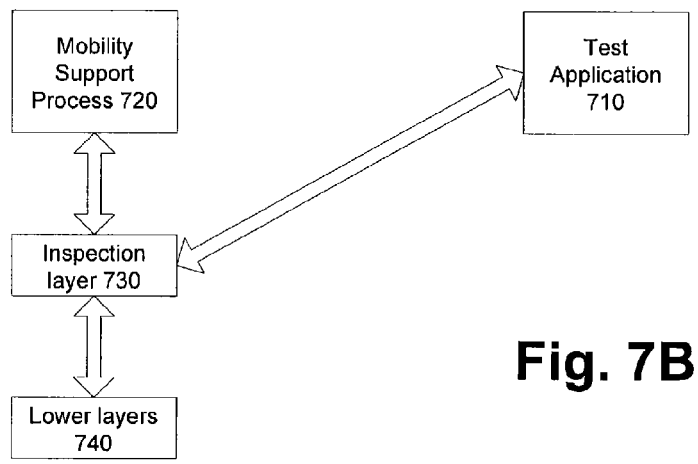
Fig. 7B
Fig. 8
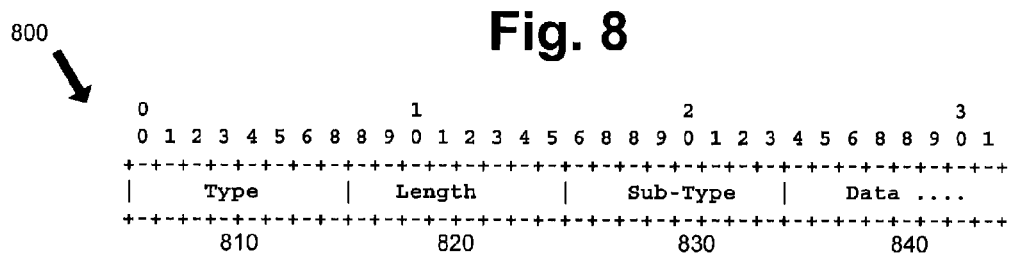

MOBILITY AWARE PERFORMANCE EVALUATION

BACKGROUND INFORMATION

Protocols supporting network access by mobile devices are well known. For example, Mobile-IP is an extension to the internet protocol (IP) that allows mobile nodes to receive datagrams wherever they happen to be attached to the Internet. To support the mobility of network nodes, Mobile-IP describes the additional control messages that are needed to allow the mobile nodes to manage their IP routing tables. The Mobile-IP protocol is described in C. Perkins, Ed., "IP Mobility Support for IPv4," RFC 3344, August 2002, published by the Internet Society of Reston, Va., and incorporated herein by reference in its entirety. Mobile-IP supports the movement of IP hosts between different sub-networks without the need to tear down established transport layer sessions. Other documents relevant to Mobile-IP include H. Chaskar, Ed., "Requirements of a Quality of Service (QoS) Solution for Mobile IP," RFC 3583, September 2003; P. Calhoun et al., "Diameter Base Protocol," RFC 3588, September 2003; D. Cong et al., Eds., "The Definitions of Managed Objects for IP Mobility Support using SMIv2," RFC 2006, October 1996; and G. Montenegro, Ed., "Reverse Tunneling for Mobile IP, revised," RFC 3024, January 2001, all published by the Internet Society of Reston, Va., and all of which are incorporated herein by reference in their entireties.

Protocols such as Mobile-IP are designed to provide appropriate routing for packets as a mobile device changes its network attachment point. Those skilled in the art will be aware that different service providers will provide different service levels, requiring different quality of service (QoS) treatment for traffic originating from, or destined to be received by, a mobile device. Such QoS requirements are further discussed in H. Chaskar, Ed., "Requirements of a Quality of Service (QoS) Solution for Mobile IP," RFC 3583, September 2003, published by the Internet Society of Reston, Va., and incorporated herein by reference in its entirety. Accordingly, parties contracting for various service levels may desire a regular service report that provides information regarding an observed service level over a specific period of time. However, although mechanisms for supporting mobile devices are known, ways are presently lacking for providing a performance monitoring report reflecting an audit of the service level experienced by the mobile device.

Conventional systems for monitoring and evaluating network performance present severe deficiencies when applied to networks that support mobile devices. For example, a traditional internet protocol (IP) network performance evaluation system is usually composed of two elements, a source and a sink. The source sends time-stamped traffic, while the sink intercepts packets generated by the source. After inspecting and analyzing packets by the sink, a conventional system will then provide the results for a testing session. Such systems are capable of evaluating end-to-end performance, i.e., performance from one fixed point attached to a network to another fixed point attached to a network, but are not designed to accommodate systems supporting mobility.

In a network including mobile devices, conventional network monitoring and evaluation systems treat the path from the source to the sink as one entity. However, in a network supporting mobile devices, this path may actually span multiple network service providers, and multiple network technologies, each potentially providing a different service level. If measurements over multiple segments of a network (including a network comprised of several service providers' networks) are needed, then multiple instances of source-sink pairs are needed at different points of the network. However, such a configuration is characterized by considerable overhead and costs that generally limit implementation of conventional network monitoring and evaluation systems. The limitations of conventional network monitoring and evaluation systems are particularly disadvantageous for mobile environments, in which a mobile device can readily and dynamically move to any service area out of many.

Further, conventional network monitoring and evaluation systems disadvantageously lack visibility into the mobility support protocol, preventing such systems from correlating network behavior to the mobility protocol events. This lack of visibility impedes the ability of conventional network monitoring and evaluation systems to differentiate results reported from a wired network from those reported from a wireless network. This is a critical shortcoming because wired and wireless networks will most likely be evaluated according to different QoS metrics based on corresponding differences in the physical characteristics of wired and wireless networks.

Moreover, conventional network monitoring and evaluation systems are not able to differentiate service degradation events caused by network failures from degradations caused by mobility related events. That is, a mobile device may suffer diminished service as it moves around, or may lose service altogether when it falls out of the range of any network attachment point. However, for conventional network monitoring and evaluation systems, such an event is indistinguishable from, e.g., a hardware failure at some point within the network.

BRIEF DESCRIPTION OF THE DRAWINGS

FIG. 7A illustrates a test application that communicates with, but is independent from, a mobility support process, according to certain embodiments.

FIG. 7B illustrates an exemplary embodiment in which a test application obtains information regarding a mobility support process without communicating directly with the process.

FIG. 8 illustrates a Mobile-IP message using a short extension to carry Test Setup Request and Test Setup Ack messages.

DETAILED DESCRIPTION OF PREFERRED EMBODIMENTS

Introduction

A flexible tool provides for evaluation of IP forwarding performance, either at times manually requested by a user, or automatically at predetermined intervals. Instead of using external probes to contact network nodes, e.g., by "pinging," the tool disclosed herein advantageously extends a mobility support protocol such as Mobile-IP.

As is known, Mobile-IP supports the mobility of IP hosts with two agents, referred to as a Home Agent (HA) and a Foreign Agent (FA). A Home Agent is a router on the home network of a mobile node that tracks and stores the current location of the mobile node. Thus, when a mobile host is attached to a network other than its home network, the Home Agent functions to forward data packets to the mobile host. A Foreign Agent is a router on a network being visited by a mobile host. When a mobile host is registered on the visited network, the Foreign Agent provides routing services for the mobile host, and delivers data packets forwarded by the Home Agent. Also, the Foreign Agent may serve as a default router for data packets sent by mobile nodes registered on the network being visited. As described herein below in more detail, embodiments of the tool disclosed herein advantageously uses certain elements and features of Mobile-IP, including Home Agents, Foreign Agents, and Registration Request and Registration Reply messages, to evaluate performance in a mobile environment. Further, although the tool disclosed herein is described with reference to Mobile-IP, it is to be understood that embodiments are possible in which other protocols are used for supporting mobile devices accessing a network.

In general, the tool disclosed herein is aware of what are referred to as mobility events. A mobility event refers to any detectable movement of a mobile host such as movement from the service area of one foreign agent to another foreign agent, being dropped from service, etc. By monitoring the performance of communications with mobile hosts through mobile events, the tool disclosed herein is advantageously able to monitor the performance of communications throughout all elements of a mobile network accessed, directly or indirectly, by a mobile host.

I. EXEMPLARY TEST ENVIRONMENT

Figure 1:
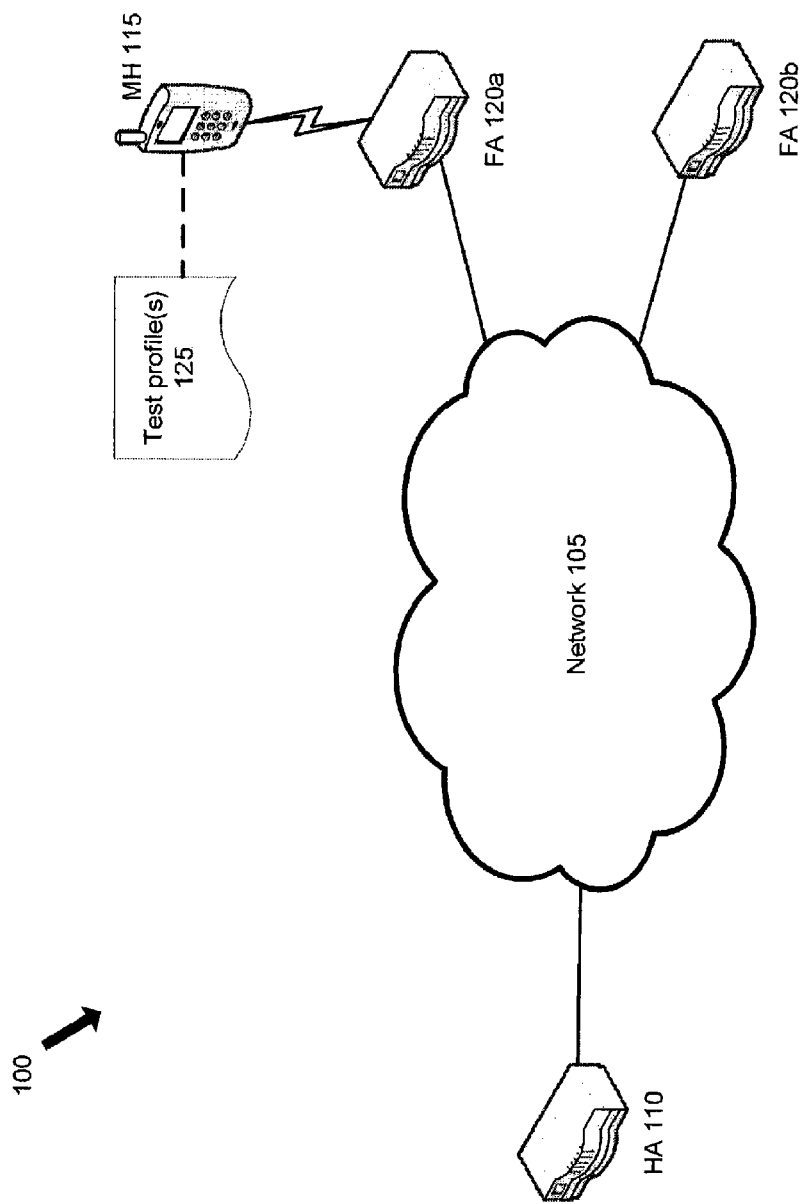
FIG. 1 depicts an exemplary test environment, according to certain embodiments.

FIG. 1 depicts an exemplary test environment 100, according to certain embodiments. A network 105, such as the Internet, includes or is connected to nodes 110 and 120. Nodes 110 and 120 may be routers or any devices known to those skilled in the art capable of routing network traffic, and capable of supporting the Mobile-IP or some similar protocol for supporting mobile network events. A router 110 serves as a home agent for another node 115, which in many embodiments is a mobile computing device. Although only one home agent 110 and one mobile host 115 are shown in FIG. 1, it is to be understood that multiple home agents 110 may provide access to the network 105 for multiple mobile hosts 115. Similarly, two foreign agents 120a and 120b are shown in FIG. 1, but it is to be understood that in most embodiments many more foreign agents 120 will be available for supporting access of mobile hosts 115.

Mobile host 115 may be any computing device capable of accessing network 105 from more than one access point. For example, mobile host 115 may be a cellular telephone, personal digital computer, laptop or notebook computer, etc. Accordingly, mobile host 115 may employ any of a number of computer operating systems known to those skilled in the art, including, but by no means limited to, known versions and/or varieties of the Microsoft Windows® operating system, the Unix operating system, the Palm OS®, the Linux operating system, etc. Those skilled in the art will recognize that the various processes described herein may be implemented as instructions executable by one or more computers or computing devices, including home agent 110, foreign agent 120, and/or mobile host 115. In general, a processor (e.g., a microprocessor) included in a computer or computing device receives instructions, e.g., from a memory, a computer-readable medium, etc., and executes these instructions, thereby performing one or more processes, including one or more of the processes described herein. Such instructions may be stored and transmitted using a variety of known computer-readable media.

A computer-readable medium includes any medium that participates in providing data (e.g., instructions), which may be read by a computer or computing device. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Mobile host 115 generally communicates with a router 110 or 120 according to one or more known standards for such wireless communications, including without limitation, cellular technologies such as CDMA, TDMA, GSM, AMPS, NAMPS, as well as wireless networking technologies such as IEEE 802.11 and/or Bluetooth. Although wireless is expected to be the technology of choice to link the mobile host 115 to the foreign agent 120, Mobile IP and the proposed protocol here may also function when mobile host 115 is uses wired media as known to those skilled in the art to connect to the foreign agent 120.

Further, mobile host 115 generally includes a set of test profiles 125 used to govern parameters for evaluating the performance of communications to and from mobile host 115, as discussed in more detail below. Test profile 125 may be generated from inputs by a user of mobile host 115, and/or may be downloaded from a source accessed through the network 105. Generally, test profile is stored in a memory or other computer readable medium associated with mobile host 115. In some embodiments, discussed in more detail below, test profiles 125 may be stored alternatively or additionally in a home agent 110 and/or a foreign agent 120.

II. TEST PROFILE

Test packets may be generated according to a predetermined test profile 125. In various embodiments the test profile 125 may be determined by either a mobile user or a network service provider. The test profile 125 is used to define parameters of a test session. Typically the test profile 125 is selected based on one or more criteria For example, if an object of a test is to troubleshoot a Voice over IP (VoIP) network issue, the test profile 125 can be selected (or configured) to match the characteristics of VoIP traffic. For flexibility, many embodiments can support two modes for the test profile selection. An element 110, 115, or 120 will inspect a test profile 125 type provided in Registration Request and Registration Reply messages and determine whether to use a predefined or a customized test profile 125.

Accordingly, in some embodiments, a predefined set of test profiles 125 are preloaded on elements 110, 115, and 120. Use of predefined test profiles 125 advantageously minimizes the amount of information that needs to be carried in Registration Request and Registration Reply messages. When a particular test is of a general nature (e.g., testing forwarding performance in a network 100) and is expected to be used frequently, it is a good candidate to be considered for a predefined test profile 125.

In some embodiments, a test profile 125 may additionally or alternatively be customized. In such embodiments all of the parameters associated with the test profile 125 are included in the test setup request. This ability to customize a test profile 125 is useful in cases where a test is being used to troubleshoot or experiment with a particular behavior, and a user may need to customize the test parameters to pin point the problem. Those skilled in the art will recognize that such customization may be carried out in a variety of known ways, e.g., via a graphical user interface (GUI) that includes fields for inputting the parameters to be customized.

In some embodiments the test profile includes some or all of the following information:
- Source and destination IP addresses for test traffic;
- Generated traffic direction: Unidirectional or bi-directional;
- Transport Protocol type;
- Source and destinations port number;
- IP header information: type of service or differentiated service bits value;
- Do not fragment flag (useful if a packet destination does not have the ability to reassemble fragments)
- Packet length;
- Test master: specifies whether the test is run by the mobile host 115 or the home agent 110.
- Trigger for test termination, which in one embodiment could be one or more of at least the following: test duration, number of packets transmitted or received during the test, or number of mobility events occurring during the test.
- Transient allowance: Time (generally in seconds) during which the system will wait to allow packets to reach destination before compiling local reports;
- System resource monitoring: activates tracking of additional information associated with resources availability (memory and CPU utilization, for example) on the home and foreign agents 110 and 120 and on mobile host 115.

III. MESSAGE FORMATS

In embodiments operating according to Mobile-IP, information specified in the test profile may be appended to the Registration Request and the Registration Reply messages. As is explained in RFC 3344, referenced herein above, Mobile-IP supports three different kinds of extension formats: simple, long, and short. FIG. 8 illustrates a Mobile-IP extension 800 using the short format to carry test setup request and test setup ACK information.

Accordingly, message 800 includes a type field 810, providing an indication of the kind of information being carried in the extension, e.g., test setup message.

Message 800 further includes a length field 820, indicating the length of the Mobile-IP extension in bytes.

Message 800 further includes a Sub-Type field 830, indicating, for example, a type of test setup message, e.g., in some embodiments a "1" or a "0" for "Test Setup Request" or "Test Setup Ack" respectively.

Message 800 further includes a Data field 840 that represents Test Profile 125. Accordingly, in some embodiments, data field 840 includes the following:
- Flags (2 byte)
- Do Not Fragment (1 bit) [0=not set, 1=set]
- System resource monitoring (1 bit) [0=disabled, 1=enabled]
- Test Profile Type (1 bit) [0=predefined, 1=customized]
- Test Termination type (4 bits) [1=time based, 2=number of packets based, 3=Mobility events based]
- Test packet length mode (1 bit) [0=fixed, 1=Variable]
- Packet rate mode (4 bits) [0=constant, 1=variable, . . . ]
- Source IP address (4 bytes)
- Destination IP address (4 bytes)
- Transport Protocol type (4 bits) [1=TCP, 2=UDP, etc.]
- Source port number (2 bytes)
- Destination port number (2 bytes)
- Type of Service (1 byte)
- Test packet length (2 bytes)
- In-transient allowance (1 byte)
- Packet length distribution vector (1 byte)
- Packet rate distribution vector (1 byte)

IV. PROCESS FLOWS

Figure 2:
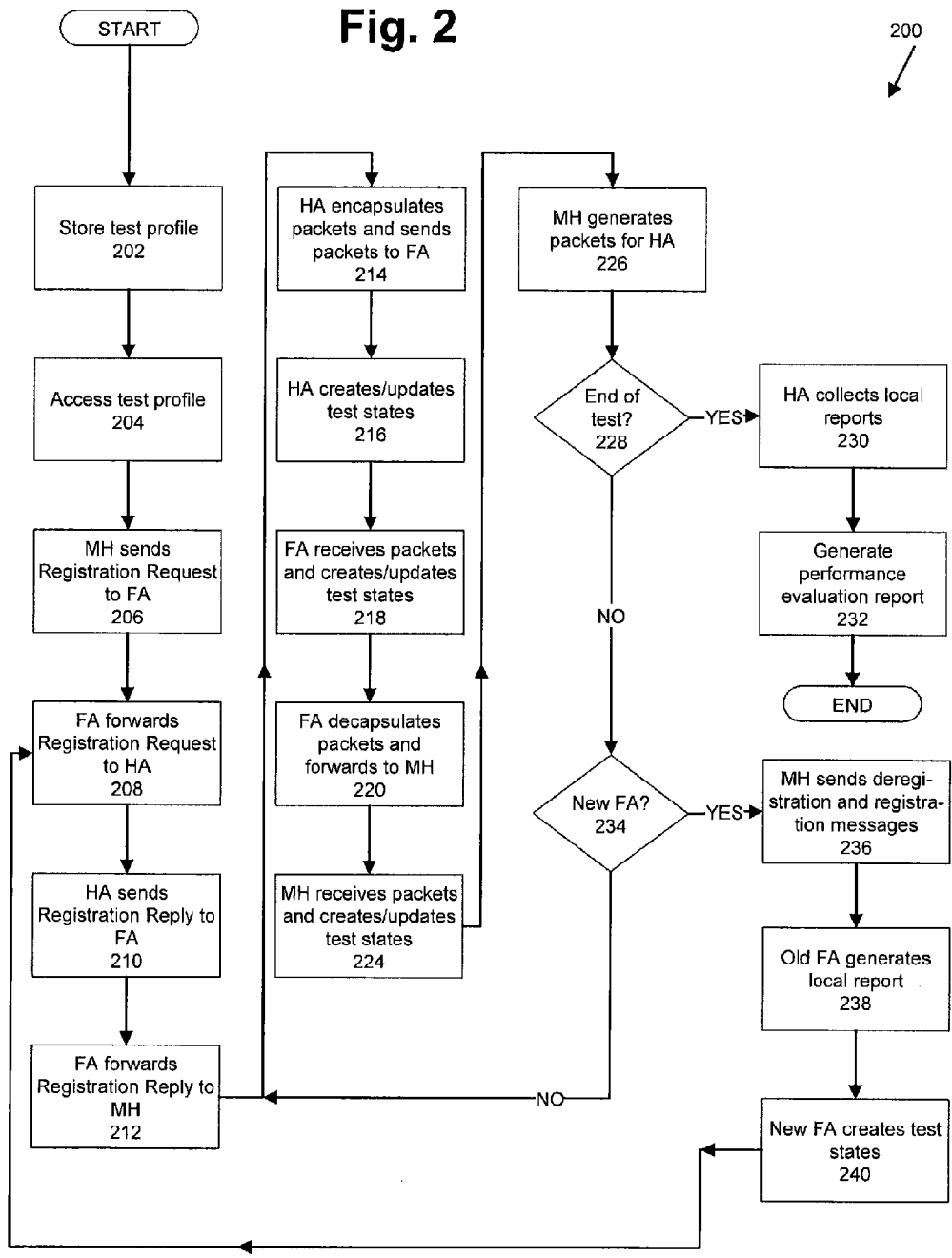
FIG. 2 depicts an exemplary process flow for evaluating performance in a mobile network environment.

FIG. 2 depicts an exemplary process flow 200 for evaluating performance in a mobile network environment 100. It is to be understood that embodiments are possible in which some, but not all, of the steps described in the process 200 are practiced, in which steps not shown in FIG. 2 are included, and/or in which steps are conducted in a different order than shown and discussed with reference to FIG. 2.

In step 202, mobile host 115 stores a test profile 125. As discussed above, this step may be carried out by receiving user input, downloading information via network 105, or by any other way known to those skilled in the art for storing information in a mobile host 115. Following step 202, control proceeds to step 204.

In step 204, mobile host 115 accesses the test profile 125. For example, in embodiments in which test profile 125 is stored on a computer readable medium such as a read only memory or a magnetic or optical disk, step 204 may include loading test profile 125 into random access memory. Following step 204, control proceeds to step 206.

In step 206, mobile host 115 initiates a test session by sending an extended Mobile-IP Registration Request to the foreign agent 120 through which the mobile host 115 is accessing the network 105. In the unusual case in which the mobile host 115 is attached directly to the home agent 110, then the Registration Request is sent directly to the home agent 110. According to certain embodiments, the Registration Request is enhanced with a novel Mobile-IP Extension that includes one bit that, when set to "1," or "true," indicates that a mobile evaluation is to take place. Further, the Registration Request extension generally includes the test profile 125, although embodiments are possible in which test profile 125 is sent in a separate, subsequent message, or in which a test profile stored on one of the mobile host 115 or the home agent 110 is used. A test session may be initiated according to user input received by mobile host 115, or mobile host 115 may be configured to begin test sessions based on predetermined times and/or events. Following step 206, control proceeds to step 208.

In step 208, according to standard Mobile-IP processing as understood by those skilled in the art, the foreign agent 120 in turn sends the Registration Request to the home agent 110 for the mobile host 115. Following step 208, control proceeds to step 210.

In step 210, the home agent 110 receives the Registration Request, including test profile 125, and sends a Registration Reply to the foreign agent 120. The Registration Reply is extended with an extension that indicates an acknowledgement, that is, "ACK," with respect to the test session setup message. Following step 210, control proceeds to step 212.

In step 212, the foreign agent 120 forwards the Registration Reply to the mobile host 115. Following step 212, control proceeds to step 214.

In step 214, the home agent 110 encapsulates and sends to the foreign agent 120 test packets according to the test profile 125. Each test packet is generally a standard IP packet with a payload that includes a test session identifier, a time stamp, and a sequence number, as well as internal header information extracted from the test profile 125. In general, the IP header for a test packet will specify as a destination address the address of the mobile host 115. The source IP address specified in the test packet may be any address local to the home agent 110 associated with the test conducted as described with reference to the process 200. The home agent 110 may look up the current "care-of" address of the mobile host 115, such a lookup according to Mobile-IP being known and understood by those skilled in the art. The home agent 110 will then add to the test packet an external header specifying as a destination IP address the address of the "careof" address of the mobile host 115, i.e., the address of the foreign agent 120. Further, it is to be understood that, if the Registration Request received from the mobile host 115 specifies multiple bindings, then the home agent 110 will forward the packet to multiple foreign agents 120. Following step 214, control proceeds to step 216.

In step 216, if step 216 has not been visited previously in the process 200, the home agent 110 creates test states; otherwise, home agent 110 updates previously created test states. It is preferable that the home agent 110 updates the appropriate test state whenever it receives or sends a test packet. An exemplary test state maintained by home agent 110 according to one embodiment includes elements referred to as follows: Test Session ID, TX_SeqNum, and RX_SeqNum, where Test Session ID is composed of sub-elements Local_Host_ID, Session_ID, and Mobility Segment_ID.

Local_Host_ID is a unique identifier associated for the home agent 110.

Session_ID is a unique identifier for a test session. It is to be understood that a home agent 110 can support simultaneous multiple test sessions (for example, one session for each of its associated mobile hosts 115).

Mobility_Segment_ID identifies the FA serving the mobile host 115 at a particular time. Mobility_Segment_ID is a necessary component of the Test Session ID because a mobile host 115 may visit multiple foreign agents 120 during a single test session.

HA_TX_Seq_Num is a data structure that includes the destination IP address and the corresponding sequence numbers for packets transmitted by the home agent 110 for the mobile host 115 via the foreign agent 120. All instances of this data structure are associated with corresponding timestamps.

HA_RX_Seq_Num is a data structure that includes the source IP address from which packets were received by the particular home agent 110. All instances of this data structure are associated with the corresponding time-stamps.

Following step 216, control proceeds to step 218.

In step 218, the foreign agent 120 to which test packets were sent in Step 214 receives the test packets and creates or updates test states as necessary. It is preferable that the foreign agent 120 updates the appropriate test state whenever it receives or sends a test packet. An exemplary test state maintained by foreign agent 120 according to one embodiment includes elements referred to as follows: Test Session ID (defined as above), FA_Fwd_Seq_Num_to_MH, FA_RX_Seq_Num_from_HA, FA_Fwd_Seq_Num_to_HA, and FA_RX_Seq_Num_from_MH.

FA_Fwd_Seq_Num_to_MH is a data structure that includes the sequence numbers of the test packets forwarded to mobile host 115, the destination mobile host 115, and the number of packets transmitted towards the mobile host 115 up to this point in the test.

FA_RX_Seq_Num_from_HA is a data structure that includes the sequence numbers of the test packets received from home agent 110, the source, the destination mobile host 115, and the number of packets received from the home agent 110 up to this point in the test.

FA_Fwd_Seq_Num_to_HA is a data structure that includes the sequence numbers of the test packets forwarded to home agent 110, an identifier for the home agent 110, and the number of packets transmitted towards the home agent 110 from each mobile host 115.

FA_RX_Seq_Num_from_MH is a data structure that includes the sequence number of the test packets received by mobile host 115, an identifier for the mobile host 115, and the number of packets received by this mobile node.

Following step 218, control proceeds to step 220.

In step 220, packets received from the home agent 110 will be forwarded to the mobile node by the foreign agent 120. Foreign agent 120 determines the mobile host 115 for which the test packets are intended, according to its standard function as specified by Mobile-IP. That is, those skilled in the art will recognize that foreign agent 120 will intercept test packets sent in an encapsulated datagram from the home agent 110 for a mobile host 115. The foreign agent 120 will then de-encapsulate the datagram and determine the intended mobile host 115 according to a visitors' list such as is known in the art. If the intended mobile host 115 can be found in the visitors' list, then foreign agent 120 forwards a test packet to its destination, and the appropriate state is updated. Following step 220, control proceeds to step 224.

In step 224, mobile host 115 receives test packet from the foreign agent 120, and creates and/or updates test states as necessary. It is preferable that the mobile host 115 updates the appropriate test state whenever it receives or sends a test packet. An exemplary test state maintained by mobile host 115 according to one embodiment includes elements referred to as follows: Test session ID (defined as described above), TX_Seq_Num, and RX_Seq_Num.

MH_TX_Seq_Num is a data structure that includes the sequence number, the destination, and the number of packets transmitted, to this point in the test, by this mobile host 115 towards the foreign agent 120, and destined for the home agent 110.

MH_RX_Seq_Num is a data structure that includes the sequence number, the source, and the number of packets received, to this point in the test, by this mobile host 115. If the mobile host 115 is receiving test packets from multiple foreign agents 120, it will maintain separate test states for each foreign agent 120. Following step 224, control proceeds to step 226.

In step 226, assuming that the test profile specifies a bi-directional test, mobile host 115 generates test packets and sends the test packets to foreign agent 120. Step 226 may be omitted in some embodiments. Following step 226, control proceeds to step 228.

In step 228, a determination is made as to whether the end of the test has been reached. This determination is generally made by the test master (specified as described above in the test profile 125) with reference to one or a combination of criteria specified in test profile 125, such as a specified time duration for the test, a number of test packets to be sent and received, a number of mobility events, etc. In some embodiments, the determination of step 228 is made by home agent 110 acting as the test master, while in other embodiments the determination of step 228 is made by mobile host 115 acting as the test master. If the end of the test has not been reached, control proceeds to step 234. Otherwise, control proceeds to step 230.

In step 230, home agent 110 collects local reports, i.e., reports from the foreign agent(s) 120 involved in the test as well as reports from mobile host 115. Local reports are described in more detail below. To initiate the collection of local reports, the test master, which as described above, may or may not be home agent 110, sends a Report Query message. The purpose of the Report Query message is to cause the elements involved in the test, e.g., home agent 110, foreign agent(s) 120, and mobile host 115, to terminate the test and to start compiling local reports, as discussed below. Generally the afore-mentioned elements will wait a period of time before compiling their local reports to accommodate for packets in transit, such period of time generally being specified in the test profile. Once a local report has been compiled, it is packaged in a Report Response message and sent to the home agent 110. The home agent 110 preferably inspects the Report Response messages received from the different elements, and, after verifying the received reports, sends a Resources Release message to each element, i.e., a message that that permits recipients to clear and restore resources that were dedicated for the test session.

In general, to send and receive the three messages described in the preceding paragraph, elements 110, 115, and 120 preferably operate in what is referred to as fast report mode. In fast report mode, Report Query, Report Response, and Resources Release messages are separate from the Registration Request and Registration Reply messages that may be sent and/or received by elements 110, 115, and 120. Thus, in fast report mode, Report Query, Report Response, and Resources Release messages are sent on demand, allowing for faster report generation.

If it is preferred to capitalize on the Registration Request and the Registration Reply messages, a mode referred to as delayed report mode may be used. In delayed report mode, elements 110, 115, and 120 use standard Mobile-IP Registration Request and Registration Reply messages with extensions to carry Report Query, Report Response, and Resources Release messages. For example, when a Report Query message is to be sent in delayed report mode, home agent 110 will use the next available Registration Reply to send the Report Query. Similarly, on receiving a Report Query, a foreign agent 120 will use the next available Registration Reply to send a Report Response message. The frequency of exchanging those messages will depend on the parameters of the current binding between elements 110, 115, and 120. For example, the lifetime of an association between a mobile host 115 and a foreign agent 120, and consequently between a foreign agent 120 and a home agent 110, will affect the frequency with which Report Query, Report Response, and Resources Release messages are exchanged in delayed report mode. It should be apparent that delayed report mode reduces the number of control messages needed to manage the test session. However, this reduction comes with the price of a likely delay in acquiring test reports and in releasing the corresponding resources. The delay can be considerable in environments in which mobile host 115 is stationary or is characterized by a very slow mobility profile, i.e., in which there are relatively few mobility events.

Following step 230, control proceeds to step 232.

In step 232, home agent 110 generates a performance evaluation report. Information that may be contained in a performance evaluation report is discussed in more detail below. Following step 232, the process 200 ends.

If it is determined in step 228 that the test is to continue, control proceeds to step 234. In step 234, mobile host 115 determines whether it has moved to a service area managed by a new foreign agent 120. If so, control proceeds to step 236. If not, control returns to step 214.

In step 236, as will be understood by those skilled in the art, mobile host 115 sends deregistration and registration requests to its old and new foreign agents 120 respectively. Following step 236, control proceeds to step 238.

In step 238, the old foreign agent 120 for the mobile host 115 generates and sends to home agent 110 a local report. Following step 238, control proceeds to step 240.

In step 240, the new foreign agent 120 for the mobile host 115 creates test states as described above with reference to step 218. Following step 240, control proceeds to step 208.

V. PERFORMANCE EVALUATION REPORTS

As stated above, after collecting local reports from the mobile host 115 and foreign agent(s) 120, the home agent 110 analyzes the collected information and generates one or more performance evaluation reports. Accordingly, information that may be included in a performance evaluation report is discussed below. Table 1 shows an example of the report information that might be presented in some einbodiments. Various elements of the information shown in Table 1 are discussed in more detail below. In table 1, "MH" refers to a mobile host 115, "FA" refers to a foreign agent 120, and "HA" refers to a home agent 110.

TABLE 1

Test Start time: 12/10/2004 8:45:10.2300
Test End time: 12/10/2004 8:55:11.4300
Test Profile:
Test Traffic flow:    Unidirectional [Node1 to Node 2]
IP address Node 1 : 192.168.1.1
IP address Node 2 : 192.168.2.1
Node 1 Family: Home Agent
Node 2 Family: Mobile Host
Foreign Agent List:, FA1_IP_address, FA2_IP_address
Stream 1: IP_Precedence=5
Packet Length: 256 bytes
Master: Home Agent
Test End Trigger: Duration=600 seconds.
Log Summary:
Node 2 (MH_ID=192.168.2.1) path:
12.10.2003.8:45:10.2300, FA1: FA_ID= 192.168.100.1
12.10.2003.8:47:10.2600, FA2: FA_ID= 192.168.101.1
Results:
Average on: 2 time segments
End_to5nd Throughput (time segment 1: 1.13 Mbps)
Throughput segment 1 (HA to FA1)= 1.14
Throughput segment 2 (FA1 to MH)= 1.12
Packet Loss due to mobility= 0.3 %
Non-mobility related packet loss=0.0%
Binding mismatch events=0, Mismatch duration=0.0 msec
Time segment 1, FA: FA1
Throughput= 1.4 Mbps

TABLE 1-continued

Packet Loss= 0.7 %
Avg Delay= 180 msec
Avg Jitter= 8 msec
Time segment 1, FA: FA1
Throughput= 1.1 Mbps
Packet Loss= 0.0 %
Avg Delay= 202 msec
Avg Jitter= 6 msec

A. Packet Loss Due to Mobility Events

Figure 3:
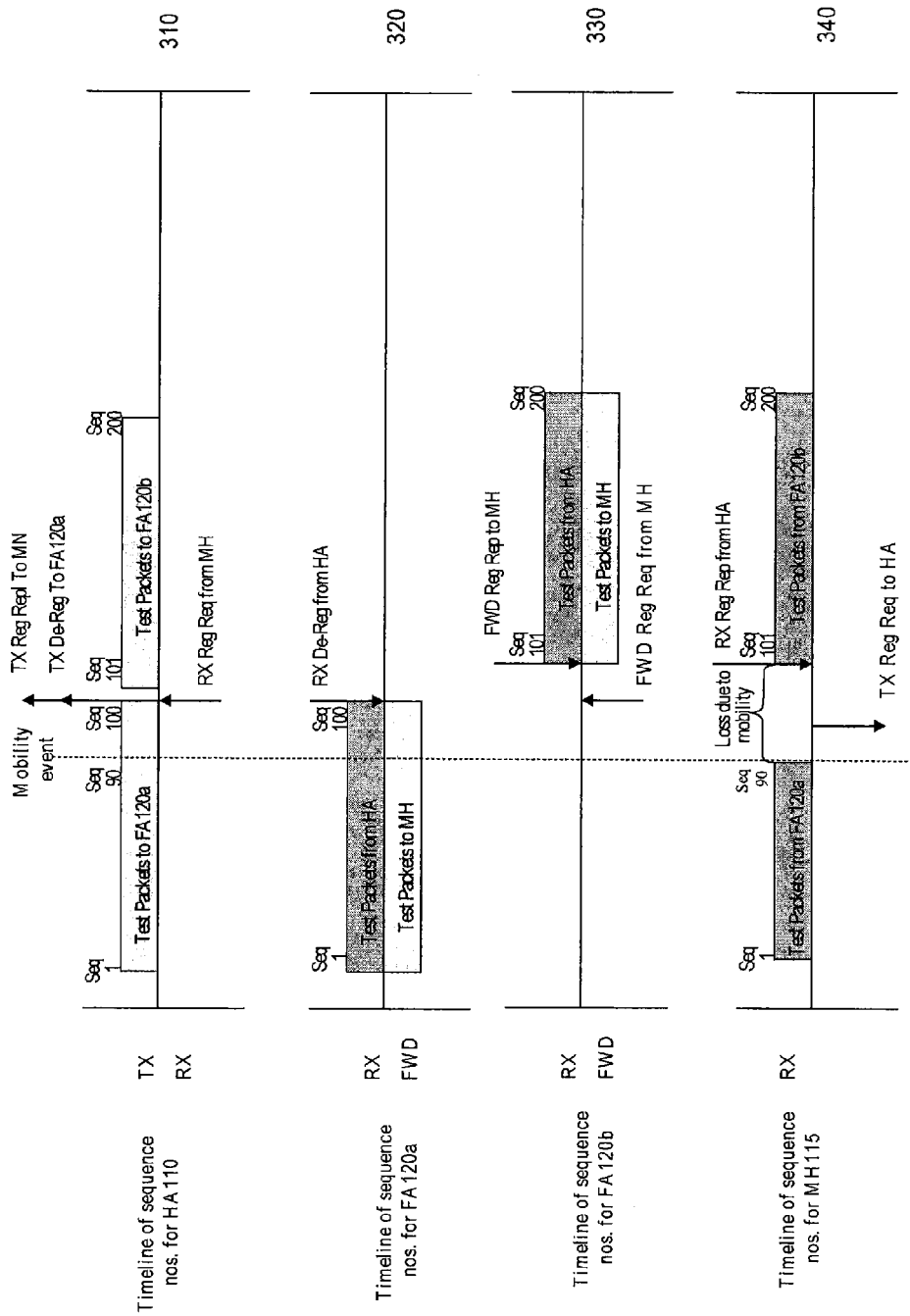
FIG. 3 illustrates an exemplary use of information derived from test state information in creating a report concerning packet loss due to mobility events.

Isolation of packet loss due to mobility events, i.e., the movement of mobile host 115 between the service areas of two or more foreign agents 120, can be understood with reference to FIG. 3. FIG. 3 illustrates an exemplary use of information derived from the TX_Seq_Num and RX_Seq_Num fields, maintained as test state information as described above, in creating a report concerning packet loss due to mobility events. Accordingly, FIG. 3 depicts timelines 310, 320, 330, and 340 of a performance test from the perspective of home agent 110, two foreign agents 120a and 120b, and mobile host 115, respectively.

Under the test scenario illustrated by FIG. 3, mobile host 115 triggers the start of a test, the test involving a unidirectional flow of test packets from a home agent 110 to the mobile host 115 while being serviced by a foreign agent 120a. Further, in the test scenario illustrated by FIG. 3, mobile host 115 moves to the service area of a foreign agent 120b, where it will stay for a period of time before the test is terminated. When the end of test trigger is generated, the home agent 110 will eventually receive local reports from the mobile host 115 and foreign agents 120a and 120b. It should be understood that FIG. 3 is exemplary and explicitly does not describe certain alternative embodiments, e.g., embodiments having a bidirectional flow of test packets, even if some or all of the principles illustrated by FIG. 3 are applicable to other embodiments.

As shown by timeline 340, mobile host 115 experiences no packet loss, i.e., "lossless delivery," beginning with the first test packet sent by home agent 110, and ending with the ninetieth test packet sent by home agent 110. However, after home agent 110 sends the ninetieth test packet, as shown in timeline 310, a mobility event, in this case the movement of mobile host 115 from foreign agent 120a to foreign agent 120b, results in mobile host 115 experiencing packet loss. As seen in timeline 320, foreign agent 120a received a deregistration request, and foreign agent 120b received a registration request, following the mobility event. Once home agent 110 receives the registration request after the hundredth packet is transmitted, the one-hundred and first packet is sent to the second foreign agent 120b, which in turn transmits that packet to the mobile host 115. Thus, from the one-hundred and first packet through the end of the test after receiving the two-hundredth packet, as shown in timeline 340, mobile host 115 once again experiences no packet loss.

As is illustrated in the timeline 340, in inspecting the received sequence number vector included in the mobile host 115 report, the report analysis process detects a packet loss window by way of a trailing time stamp that coincides with the event of the mobile host 115 sending a Registration Request. The process then preferably will verify that this Registration Request has a different identifier from prior Registration Requests (thereby avoiding interpreting a renewed or retransmitted Registration Request as a mobility event). Inspecting time stamps in the backward direction of the timeline 340, the process will identify the first packet sequence number, in a given contiguous loss window, that is associated with a given mobility event. In the example of timeline 340, the sequence numbers from 91 to 100 correspond to the packet loss associated with a mobility event. The process will then continue in inspecting the remaining sequence numbers in the received sequence number vector. If the received local reports reflect mobility events, the results are partitioned to segments, where each segment corresponds to a single visit to a foreign agent 120. The analysis process inspects each time segment and interprets any packet loss other than the one detected at the end of the segment as non-mobility associated loss.

Accordingly, FIG. 3 illustrates the ability of home agent 110 to provide reporting regarding packet loss due to mobility events. In the case illustrated by FIG. 3, home agent 110, after analyzing the received reports, would report that a packet loss was experienced by mobile host 115 between the transmission of the ninetieth and one-hundred and first packets, and that this packet loss was due to a mobility event.

B. Network-Related Packet Loss

Figure 4:
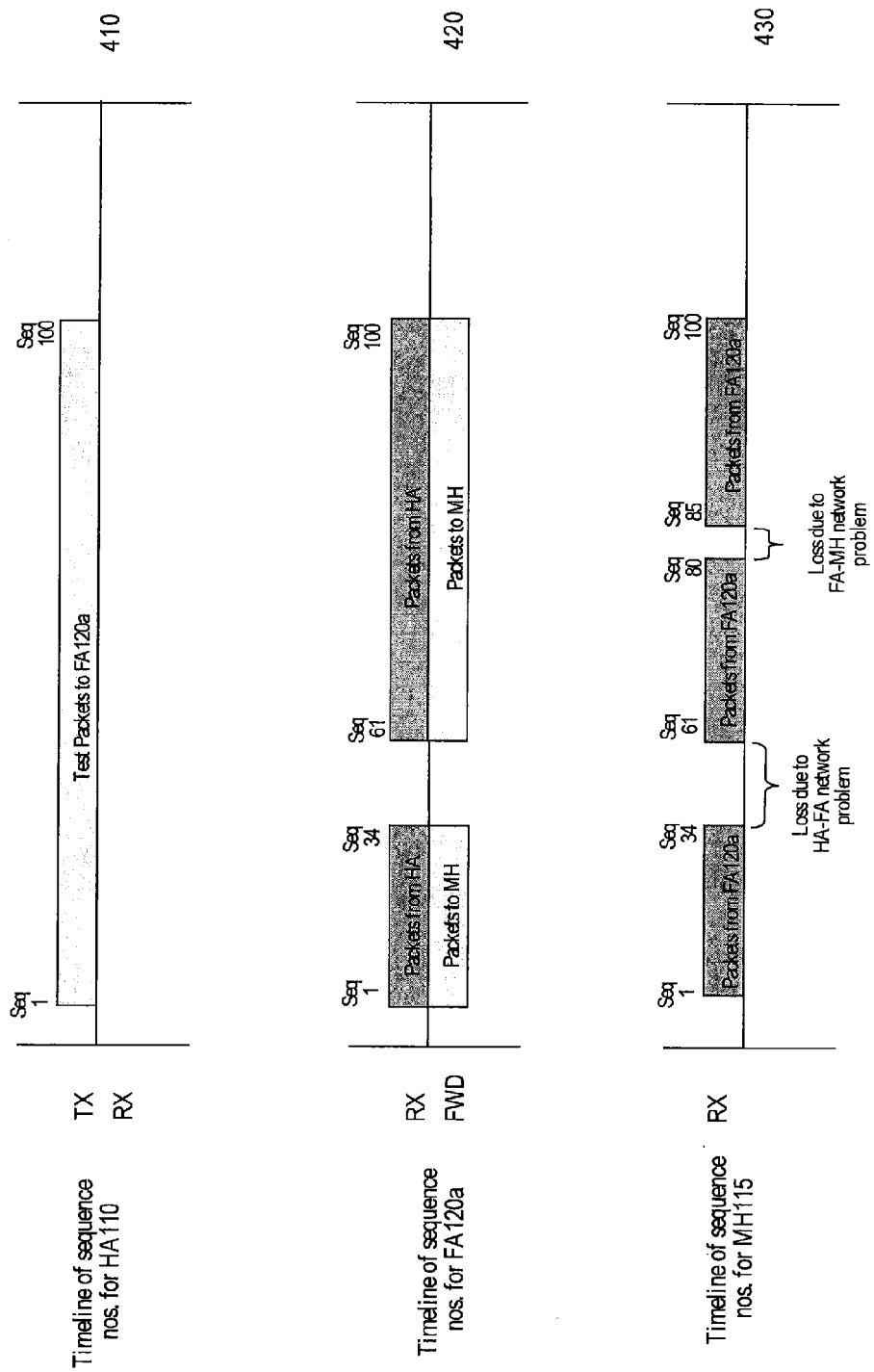
FIG. 4 illustrates an exemplary use of information derived from test state information in creating a report concerning packet loss due to one or more network malfunctions.

In addition to packet loss caused by mobility events, it is also possible in a mobile environment to suffer packet loss dues to various kinds of network malfunctions. FIG. 4 illustrates an exemplary use of information derived from the TX_Seq_Num and RX_Seq_Num fields, maintained as test state information as described above, in creating a report concerning packet toss due to one or more network malfunctions. Similar to FIG. 3, FIG. 4 depicts timelines 410, 420, 430, and 440 of a performance test from the perspective of home agent 110, two foreign agents 120a and 120b, and mobile host 115, respectively. As in FIG. 3, FIG. 4 shows a mobility event occurring at a point in time near the transmission of the ninetieth packet, although under the scenario shown in FIG. 4, there is no packet loss associated with the mobility event. However, as can be seen in the timeline 430, mobile host 115 does experience two distinct periods of packet loss during the test scenario depicted in FIG. 4.

1. Packet Loss Between Home Agent and Foreign Agent

One possible point of network malfunction lies in the network path (generally, but not necessarily, a path in a wired network) between home agent 110 and a foreign agent 120. For example, timeline 430 shows that mobile host 115 experienced a packet loss after receiving a packet with sequence number thirty-four, and that this packet loss continued until the mobile host 115 received a packet with sequence number sixty-one. A comparison of timelines 410 and 420 shows that home agent 110 transmitted packets with sequence numbers one through one-hundred, including thirty-five through sixty, but that foreign agent 120a received only packets with sequence numbers one through thirty-four and sixty-one through one-hundred. That is, packets with sequence numbers thirty-five through sixty were lost between home agent 110 and foreign agent 120a.

A comparison of time stamps included in packets having sequence numbers thirty-five through sixty with time stamps of registration and deregistration requests received by home agent 110 confirms that the packet loss experienced by the mobile host 115 was not due to a mobility event. Accordingly, home agent 110 should generate a report attributing the packet loss experienced by mobile host 115 packets with sequence numbers thirty-five through sixty to the network segment between the home agent 110 and the foreign agent 120a.

2. Packet Loss Between Foreign Agent and Mobile Host

Another possible point of network malfunction lies between a foreign agent 120 and mobile host 115. Those skilled in the art will recognize that the link between foreign agent 120 and mobile host 115 will be susceptible to congestion, link quality degradation, etc. With reference to FIG. 4, the difference between (a) the number of packets received by mobile host 115 in timeline 430, and (b) the number of packets forwarded by a foreign agent 120 in timeline 420, represents a packet loss due to a malfunction in the network link between the foreign agent 120a and the mobile host 115. Accordingly, home agent 110 may include in a test report such a difference attributed to issues with the network link between the foreign agent 120a and the mobile host 115 above.

C. Control and Signaling Related Packet Loss

Figure 5:
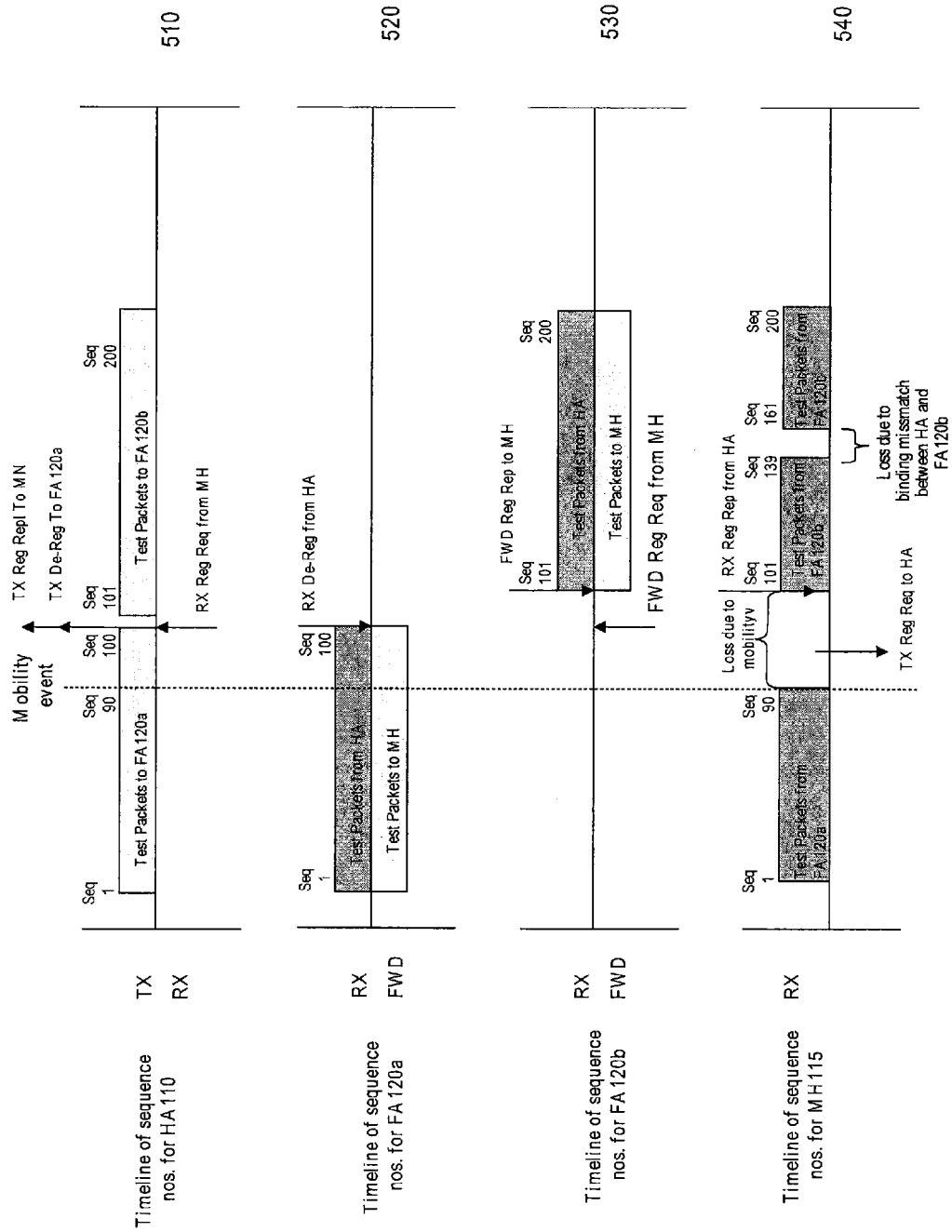
FIG. 5 illustrates an exemplary use of information derived from test state information in creating a report concerning packet loss due to control and signaling issues.

Mobile host 115 may further experience packet loss because a foreign agent 120, having received packets from home agent 110 intended for the mobile host 115, is unable to forward the packets to the mobile host 115. An illustration of such a packet loss is illustrated in FIG. 5 with reference to timelines 530 and 540. Despite the fact that foreign agent 120b experiences no gaps in packets received for home agent 110, mobile host 115, as shown in timeline 540, experiences a packet loss between the packet with sequence number one-hundred and thirty-nine and one-hundred and sixty-one. Accordingly, when home agent 110 determines that a foreign agent 120b has received packets for mobile host 115 that it did not forward, the following information will be relevant.

- The time stamp and the corresponding packet sequence number for which this loss was first experienced by the mobile host 115;
- The total number of packets lost and the duration of the loss;
- The time stamp for a registration request sent form the mobile host 115 to the foreign agent 120;
- The time stamp associated with the foreign agent 120 forwarding a registration request to the home agent 110;
- The time stamp associated with the home agent 110 sending a registration reply to the foreign agent 120;
- The time stamp associated with the foreign agent 120 forwarding a registration reply to mobile host 115.

Timelines 530 and 540 in FIG. 5 illustrate how this information can be used Local reports from foreign agent 120b will show that all packets sent from the home agent 110 to the foreign agent 120b were in fact received by foreign agent 120b, including packets with sequence numbers one-hundred and forty to one-hundred and sixty. However, local reports from foreign agent 120b, under this scenario, will also show that the intended mobile host 115 cannot be found in the local visitor list of foreign agent 120b for the sequence of packets in question. Accordingly, home agent 110 inspects time stamps for the registration request and registration replies exchanged between the mobile host 115, foreign agent 120b, and the home agent 110. Analysis of these time stamps will show that the afore-mentioned control messages were properly sent and received. In particular, home agent 110 can determine that the foreign agent 120b received a valid registration reply according to which the foreign agent 120b forwarded packets to the mobile host 115, including packets with sequence numbers one-hundred and forty to one-hundred and sixty.

Based on this information reported by home agent 110, a further inspection of the local processes on foreign agent 120b may be warranted. For example, the packet loss could have been caused by malfunction of the process of managing the visitor table (i.e., a table that lists visiting mobile hosts currently serviced by the FA, for example mobile host 115) on the foreign agent 120b as a possible source of the problem. For example, analysis of the foreign agent 120b may determine that the foreign agent 120b was unable to locate the mobile host 115 due to a corrupted memory, disk "thrashing," or some other hardware and/or software failure that those skilled in the art may be able to detect from an inspection of log files, etc. on foreign agent 120b.

D. Delay and Jitter

In addition to reporting on packet loss, home agent 110 may also report on delay and jitter experienced during a test session. Delay values may be calculated according to differences in time stamps for packets sent and received respectively by home agent 110, a foreign agent 120, and mobile host 115. That is, for each packet, the delay encountered over each network link can be calculated. Further, by compiling delay values for the same packet over the different network segments, total and average delay values can be reported for the packets sent during a test session.

Similarly, by calculating differences in time stamps between two packets in sequence, for both transmitted and received packets, jitter values may be calculated. When the goal of a test session is to evaluate jitter, it is desirable to configure the test profile such that generated packets will represent different types of data traffic (e.g., video and voice for example) because, as those skilled in the art will recognize, jitter is most likely to be a concern when it becomes necessary to synchronize different types of data such as video data and voice data, etc.

E. Management Metrics

Various additional metrics may be useful to network service providers and others seeking to better understand and improve delivery of mobile network services, and may be included in the report of a home agent 110. For example, the amount of time it takes for a mobile host 115 to be handed from a first foreign agent 120a to a second foreign agent 120b may be reported, this amount of time being measurable, for example, according to the differences in time stamps between the time when a mobile host 115 sends a registration request and the time when the mobile host 115 receives a registration reply. Similarly, delay values for the registration request and registration reply messages are recorded.

Also, elements 110, 115, and 120 may each include in local reports local statistics, such as memory utilization, processor utilization, etc. Such statistics may be associated with mobility events in a report generated by home agent 110. Such reporting is potentially of great value to network service providers, allowing such service providers to more optimally configure their networks. For example, based on such information, a service provider may determine that a foreign agent 120 is poorly located relative to the home agent 110, such sub-optimal location of the foreign agent 120 contributing to unacceptable network performance. Accordingly, the service provider may wish to reconsider the location of the foreign agent 120.

VI. EXEMPLARY IMPLEMENTATIONS

A. Hierarchical Environments

Figure 6:
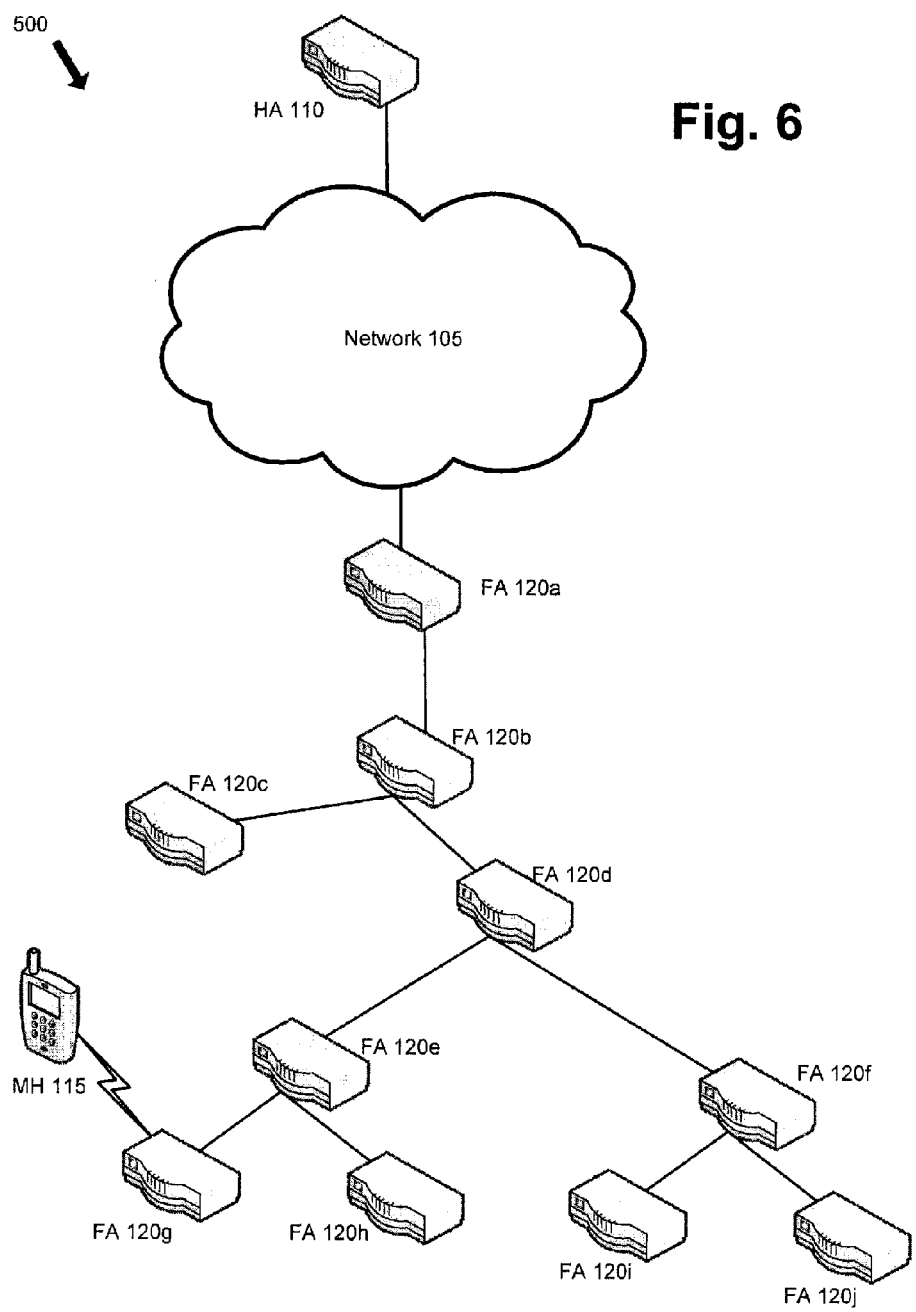
FIG. 6 illustrates an exemplary hierarchical Mobile-IP environment.

As known and understood by those skilled in the art, Mobile-IP may be implemented in hierarchical environments. FIG. 6 illustrates an exemplary hierarchical Mobile-IP environment 600. Home agent 110 and a first foreign agent 120a communicate through a network 105. Foreign agents 120 are arranged hierarchically in a regional topology, and a mobile host 115 may move from one serving area to another in the same regional topology without the need to bind location information at the home agent 110. Thus, hierarchical Mobile-IP allows a mobile host 115 to send registration requests to a regional foreign agent 120a. Foreign agent 120a in turn is placed at the top of a hierarchy of foreign agents 120a, 120b, 120c, 120d, 120e, 120f, 120g, 120h, 120i, etc. The foreign agent 120a tracks movement of a mobile host 115 but does not forward registration requests to the home agent 110.

In other words, in the case of hierarchical Mobile-IP, the mobility of the mobile host 115 is hidden from the home agent 110. In terms of providing the reporting functionality described above, home agent 110 in a hierarchical Mobile-IP environment lacks the information needed to determine the time segments corresponding to mobility events. Accordingly, in embodiments including a hierarchical Mobile-IP environment, it is desirable to have the foreign agent 120a at the top, or root, of the hierarchy generate a detailed local report that details the mobility if this FA was the root of the common lineage between a previous and a new mobile node location.

In the example illustrated in FIG. 6, when the mobile node 115 moves from foreign agent 120g to foreign agent 120h it will send a regional Registration Request to foreign agent 120e. The Request will not be forwarded any further upstream. Foreign agent 120e has visibility into this mobility event, and, in addition to the existing segment (which is associated with the previous location foreign agent 120g), it will create an additional new segment report that corresponds to the new location of the mobile node at foreign agent 120h.

B. Implementation as a Test Application

Embodiments discussed above include the integration of certain control messages for a test session within existing mobility protocols such as Mobile-IP. Accordingly, in the foregoing embodiments, a test session is initiated simply by including additional information in, for example, Mobile-IP Registration Request and Registration Reply messages. Such embodiments are often preferred because, as should be apparent, they maximize processing efficiency and minimize overhead. However, in some situations, for example, where it is desirable to allow development and/or testing activities by different entities, it may be preferred to keep the control of a test session separate from the existing mobility support protocol. Accordingly, as shown in FIG. 7A, in some embodiments it is possible to initiate a test session from a test application 710 that communicates with, but is independent from, a mobility support process 720. In such embodiments, test application 710 generates its own control messages exclusive of Mobile-IP or any other protocol.

In embodiments implementing a test application 710 to control a test session, a test application 710 runs on each of home agent 110, mobile host 115, and foreign agent(s) 120. Application processes on each of elements 110, 115, and 120 listen for control messages directed to the element 110, 115, or 120. Accordingly, in one embodiment, the application 710 generates the following messages in addition to the report generation related messages described above:

Test_Session_Setup_Req, which is a message that contains Test Profile 125 information as well as a request to initiate a test session.

Test_Session_Setup_ack, which is a message used to acknowledge receipt of a Test_Session_Setup_Req message.

In one exemplary embodiment, an application process on each of elements 110, 115, and 120 listens at a first specified TCP (Transport Control Protocol) port for Test_Session_Setup_Req messages, and at a second specified TCP port for Test_Session Setup_Ack messages. For example, if a test session is to be initiated by a mobile host 115, the mobile host 115 will send a Test_Session Setup_Req message to a specified TCP port on the foreign agent 120, which will in turn receive the Test_Session_Setup_Req message and forwards it a specified TCP port on home agent 110. Home agent 110 responds with a Test_Session_Setup_Ack message sent to a specified port on foreign agent 120, which in turn sends the Test_Session_Setup_ack message to the mobile host 115, at which point the mobile host 115 or the home agent 110, as specified by the test profile 125, will start sending test messages.

According to the foregoing exemplary embodiment, if the mobile host 115 moves to a region covered by a different foreign agent 120 at any time during the test, it will send a Test_Session_Setup_Req message to the new foreign agent 120, which in turn sends this message to the home agent 110. Home agent 110 in turn sends a Test_Session_Setup_Ack message to the new foreign agent 120. In such an event the test application is generally programmed to recognize that a mobility event has occurred and to continue the test through the new foreign agent 120.

As shown in FIG. 7A, test application 710 communicates with a mobility support process 720 to obtain needed state information related to the use of Mobile-IP or similar mobility support protocol. As should become apparent, such information is needed to generate the local reports described above. For example, continuing the description of the exemplary embodiment referred to above, test application 710 obtains the following information from mobility support applications 720 on each of elements 110, 115, and 120 respectively:

On the home agent 110:
IP addresses for mobile hosts 115 serviced by this home agent 110;
Time stamped records for generated and received registration requests and replies;
Mobility event notification (based on Mobile-IP control messages).

On the mobile host 115:
IP address for the current foreign agent 120;
IP address for home agent 110;
Time stamped records for generated and received registration requests and replies.
Mobility event notification (based on Mobile-IP control messages).

On the foreign agent 120:
IP addresses for mobile hosts 115 currently serviced by the foreign agent 120;
Time stamped records for the processed registration requests and replies;
Time stamped records for the processed deregistration messages.

It is to be understood that the foregoing could also be a listing of test information that is reported in embodiments in which control messages for a test session are integrated within existing mobility protocols such as Mobile-IP, as discussed above.

FIG. 7B illustrates an alternative exemplary embodiment in which test application 710 obtains information regarding mobility support process 720 without communicating directly with the process 720. Instead, the application 710 uses a transparent inspection layer 730 interposed between the mobility support process 720 and lower level network layers 740 to inspect Mobile-IP packets, and to thereby extract mobility support state information. Accordingly, the layer 730 inspects packets to identify those associated with mobility events generated or received by mobility support process 720. When such packet is detected, the corresponding information is provided to the application 710, which extracts the information identified above as described for each of elements 110, 115, and 120.

C. Implementation Using a Correspondent Host

In examples above, home agent 110 was used as the element generating the test packets. However, in some situations, it is desired to source test packets from a correspondent host other than home agent 110, e.g., a host directly connected to home agent 110, or located anywhere and connected to the Internet. Generally, such a correspondent host is not involved in the control plane for a mobility support protocol, and thus a performance monitoring process based on a test application 710, such as is illustrated in FIG. 7B, is an appropriate candidate for such an environment.

Further, it should be understood that a mobile host 115 can act as a correspondent host, and also can be either a source or a sink for traffic in network 105. Systems and methods discussed above are applicable to the case when a correspondent host is used to generate test packets. In such environment, the correspondent host will need to support the Test_Session_Setup_Req and Test_Session_Setup_Ack messages, in addition to generating and sending local reports. An example of situations where such implementation may be preferred is when there is a concern regarding the load that will be placed on the home agent 110 if it acts as the source for packets associated with multiple test sessions. Also in some cases, it may be desired for the test to mimic closely a particular situation e.g., when trying to troubleshoot a problem that is related to the proximity of the source to both the home agent 110 and the mobile host 115. In this situation, flexibility in selecting the location of the correspondent host (the source) will aid troubleshooting.

VII. CONCLUSION

With regard to the processes, methods, heuristics, etc., described herein, it should be understood that, although the steps of such processes, etc. have been described as occurring according to a certain ordered sequence, such processes could be practiced with some or all of the described steps performed in parallel or in an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. It is anticipated and intended that future developments will occur in the field of networks, and that the disclosed systems and methods will be incorporated into such future embodiments. Accordingly, it should be understood that the invention is capable of modification and variation and is limited only by the following claims, along with the full scope of equivalents to which such claims are entitled.

What is claimed is:

1. A method, comprising:
sending, from a first node in a network to a second node in the network, an initial message indicating a test, wherein the initial message is intended to be received by a third node in the network;
conducting the test by sending at least one test message from the first node to the second node, wherein the test message is intended to be received by the third node;
determining, during the test, whether the test message that is intended for the third node should be sent to a fourth node, rather than to the second node; and
collecting test information, after the test has been conducted, from at least one of the first node, the second node, and the third node.

2. The method of claim 1, further comprising using the test information to determine at least one of: whether any mobility events have occurred during the test and the cause or causes of any packet loss that occurred during the test.

3. The method of claim 1, wherein the initial message is formatted according to a protocol for mobile communications.

4. The method of claim 1, wherein at least one of the first node, the second node, and the third node is a mobile host.

5. The method of claim 1, wherein at least one of the first node, the second node, and the third node is a router.

6. The method of claim 1, wherein the initial message is a Mobile IP message, and the test is indicated as an extension flag to the Mobile IP message.

7. The method of claim 1, further comprising conducting the test by sending at least one test message from the third node to the second node, wherein the test message is intended to be received by the first node.

8. The method of claim 1, further comprising conducting the test by sending at least one test message from the first node to the fourth node, wherein the test message is intended to be received by the third node.

9. The method of claim 8, further comprising collecting test information, after the test has been conducted, at least in part from the fourth node.

10. A system, comprising:
a first node in a network that is configured to send, to a second node in the network, an initial message indicating a test, wherein the initial message is intended to be received by a third node in the network;
a test application configured to conduct a test by sending at least one test message from the first node to the second node, wherein the test message is intended to be received by the third node, said test application further configured to collect test information from at least one of the first node, the second node, and the third node after the test has been conducted, wherein the test application is integrated with a program for sending control messages according to a mobility support protocol.

11. The system of claim 10, wherein the first node is further configured to use the test information to determine at least one of: whether any mobility events have occurred during the test and the cause or causes of any packet loss that occurred during the test.

12. The system of claim 10, further comprising determining, during the test, whether the test message that is intended for the third node should be sent to a fourth node, rather than to the second node.

13. The system of claim 10, wherein the initial message is formatted according to a protocol for mobile communications.

14. The system of claim 10, wherein at least one of the first node, the second node, and the third node is a mobile host.

15. The system of claim 10, wherein at least one of the first node, the second node, and the third node is a router.

16. A tangible computer readable medium embodying computer executable instructions for:
   sending, from a first node in a network to a second node in a network, an initial message indicating a test, wherein the initial message is intended to be received by a third node in a network;
   conducting the test by sending at least one test message from the first node to the second node, wherein the test message is intended to be received by the third node; and
   collecting test information, after the test has been conducted, from at least one of the first node, the second node, and the third node.

17. The instructions of claim 16, further comprising instructions for using the test information to determine at least one of whether any mobility events have occurred during the test and the cause or causes of any packet loss that occurred during the test.

18. The instructions of claim 16, wherein the initial message is formatted according to a protocol for mobile communications.

19. The instructions of claim 16, wherein at least one of the first node, the second node, and the third node is a mobile host.

20. The instructions of claim 16, wherein at least one of the first node, the second node, and the third node is a router.

* * * * *